(12) United States Patent
Webb et al.

(10) Patent No.: US 7,574,403 B2
(45) Date of Patent: Aug. 11, 2009

(54) PATRONAGE INCENTIVE SAVING SYSTEM AND METHOD FOR RETAIL BUSINESSES

(75) Inventors: Christopher S. Webb, Baltimore, MD (US); Thomas E. Katana, Baltimore, MD (US)

(73) Assignee: Roundit, Inc., Baltimore, MD (US)

( * ) Notice: Subject to any disclaimer, the term of this patent is extended or adjusted under 35 U.S.C. 154(b) by 1626 days.

(21) Appl. No.: 10/066,597

(22) Filed: Feb. 6, 2002

(65) Prior Publication Data

US 2002/0120513 A1  Aug. 29, 2002

Related U.S. Application Data

(63) Continuation-in-part of application No. 09/531,412, filed on Mar. 20, 2000.

(51) Int. Cl.
*G06Q 40/00* (2006.01)
(52) U.S. Cl. .................... 705/39; 705/1; 705/7; 705/26; 705/27; 705/35; 705/38; 705/40; 705/14
(58) Field of Classification Search .................. 705/14, 705/39, 35, 38, 40, 1, 26
See application file for complete search history.

(56) References Cited

U.S. PATENT DOCUMENTS

| | | | |
|---|---|---|---|
| 4,751,640 A | 6/1988 | Lucas et al. | |
| 5,202,826 A | 4/1993 | McCarthy | |
| 5,297,026 A | 3/1994 | Hoffman | |
| 5,483,444 A | 1/1996 | Heintzeman et al. | |
| 5,513,102 A | 4/1996 | Auriemma | |
| 5,537,314 A | 7/1996 | Kanter | |
| 5,621,640 A | 4/1997 | Burke | |
| 5,689,100 A | 11/1997 | Carrithers et al. | |
| 5,734,838 A | 3/1998 | Robinson et al. | |
| 5,774,870 A | 6/1998 | Storey | |
| 5,937,391 A | 8/1999 | Ikeda et al. | |
| 5,970,480 A | 10/1999 | Kalina | |
| 5,983,196 A | 11/1999 | Wendkes | |
| 5,991,736 A | 11/1999 | Ferguson et al. | |
| 6,088,682 A | 7/2000 | Burke | |
| 6,112,191 A | 8/2000 | Burke | |
| 6,164,533 A * | 12/2000 | Barton | 235/380 |
| 6,243,688 B1 * | 6/2001 | Kalina | 705/14 |

OTHER PUBLICATIONS

Lisa Rapaport, "Oakland, Calif.-Based Web Site Rewards Surfers", KRTBN Knight-Ridder Tribune Business News (Contra Costa Times—Walnut: Oct. 19, 1999.*

* cited by examiner

*Primary Examiner*—Jean D. Janvier
(74) *Attorney, Agent, or Firm*—Nixon & Vanderhye PC

(57) ABSTRACT

A method of doing business in a retail environment employs a patronage incentive system incorporating a rounding up saving software program which provides a customer making a purchase at a point-of-sale terminal of participating retailers with an option to round up the price of purchase to the nearest dollar (or higher), to credit the difference between the rounded and the retail price to an account once the purchase is made, and to invest the savings into a single predetermined mutual fund. The rounding up program establishes a personal account for each customer, establishes a cumulative account with the single mutual fund, interacts with the customer, and, upon the request of customer, provides the customer with the information regarding his/her account current and/or prospective.

33 Claims, 8 Drawing Sheets

PATRONAGE INCENTIVE SAVING SYSTEM AND METHOD FOR RETAIL BUSINESSES

This Patent Application is a Continuation-in-Part of a patent application Ser. No. 09/531,412 filed Mar. 20, 2000.

FIELD OF THE INVENTION

The present invention relates to a system and method of doing business in a retail environment, and more particularly, to a patronage incentive saving system for retail businesses.

More particularly, the present invention relates to a patronage incentive system in which the price of an article's purchase is rounded up to a rounded dollar amount upon a customer request and approval. The difference between the rounded dollar amount of the purchase and the retail price is then credited to a customer's savings or other account for further investment into investment areas available in the marketplace.

More specifically, the present invention relates to a patronage incentive system in which a customer enrolled in the system visits a point-of-sale of a participating retailer, makes a purchase, and is then offered an option to save money. The option given takes the form of a request as to whether the customer would like to save and round the price of the purchase to the next nearest higher dollar amount or any other higher dollar amount. In this manner, upon the customer's approval to "round it", a saving software program of the patronage incentive system (which is integrated into the point-of-sale software of the retailer) "rounds up" the price of the purchase to the nearest higher dollar (or to a greater dollar amount). The difference between the rounded and the retail price is then credited to the customer's personalized rounded account. The savings may be further transferred for investment in investment areas available in the market, for example, a predetermined single mutual fund thus receiving gain for the saved money and achieving a long-term savings.

In this manner, the patronage incentive system develops the loyalty of a customer to a certain retailer and encourages the customer to make frequent purchases to attain greater savings and investment income.

Additionally, the present invention relates to a retail business in which a plurality of retail partners participate in the "Round It" saving program in order that a customer may find a "Round It" option at the point-of-sale of each of participating retail partners. Thus the customer is not limited to a single retail partner, but has a diversity of participating retail partners' point-of-sales to visit for purchases and saving investment opportunities.

The customer is free to visit a retail partner's point-of-sale or a web site, and, upon making a purchase, is provided with the option of "rounding up the price of purchase and to save". This enhances the saving power of the patronage incentive system of the present invention and increases loyalty of the customer to retail partners participating in the patronage incentive system of the present invention.

The present invention also relates to a method of operating a patronage incentive system whereby a small amount (the difference between the rounded price amount and the retail price of the purchase) saved each time a purchase is made is credited to the customer's saving account for further investment in an investment area, such as a single predetermined mutual fund, grows rapidly.

In general, the subject invention relates to a system and method where a purchaser is given the option to round up a purchase amount to a higher rounded dollar amount. The method may be applied to either a point of purchase established or through an Internet-based facility. The difference between the actual purchase price and the chosen rounded dollar amount is then transferred to a savings or investment institution for the benefit of the customer.

BACKGROUND OF THE INVENTION

Patronage incentive systems in a customer-retailer environment induce customer loyalty and provide stimulus for customers to enter into transactions with retailers who employ the incentive system. Patronage incentive systems encourage the customer to purchase services and products offered by a retailer by providing the customer with the opportunity to obtain, in addition to purchased goods or services, an opportunity to increase their savings potential.

PRIOR ART

Patronage incentive systems have been provided which include cash refunds or credits, opportunities to win prizes, free merchandise, discounted prices, etc.

For example, one type of prior art patronage incentive award system involves the retailer issuing coupons which customers can use beneficially in a transaction with the retailer. Another type of patronage incentive award system uses the award of merchandise selected from a catalog as an incentive award to the customer to engage in transactions with the retailer. In yet another type of patronage incentive award system a customer is awarded a number of points for a transaction. The number of points awarded may depend on the monetary value of the transaction, the frequency of transactions the customer has with the vendor, or the time period in which the transactions are conducted.

Patronage incentive award systems have been developed by the travel industry and are generally referred to as a "Frequent Flyer Program". When a traveler books a flight, a certain amount of mileage points is calculated by a formula using the distance of the destination as a calculation parameter. When the traveler has accumulated a sufficient number of mileage points, he/she may redeem these points for an award chosen from a specific list of awards specified by the program. Thus, for example, the traveler may redeem the points for a free flight ticket or a free rental car.

Still another type of patronage incentive system involves the retailer awarding credit to the customer which may be used by the customer toward later transactions with the retailer. The amount of the credit awarded may depend on the monetary value of the transaction, the frequency of transactions, or other transactional characteristics such as the specific goods or services involved in the transaction.

In an alternative type of patronage incentive award system, the retailer awards a flat cash payment to the customer when the customer attains a certain spending level that is related to the transactions the customer has with the retailer.

Each patronage incentive systems typically used in the retail business tend to focus on providing a short term benefit to the customer as an incentive for the customer to patronize the retailer. These systems and methods are not directed to a generally long-term saving program relating to investments made by the customer.

Patronage incentive award systems have been developed for providing a long-term advantage to the customer. One such system directed to a customer's retirement security is disclosed in U.S. Pat. No. 5,991,736 ('736), in which a monetary award is made to a customer's retirement account as incentive to the customer for participating in a transaction with the retailer for the retailer's goods or services. The system includes a mechanism for identifying the customer, means for inputting the identification information and some other information about the transaction into a computer data storage system, and a computer data processing device which operationally uses a software program along with the transactional information to calculate an incentive award amount.

The system further includes a mechanism for transferring the monetary funds equal to the incentive award amount from an incentive award pool to the customer's retirement account, and means for reporting the incentive award amount to the customer and the retailer. Thus, this type of patronage incentive system provides a customer with an incentive award to patronize the retailer and addresses the customer's long-term needs by providing for his/her retirement security.

Although having certain advantages, the patronage incentive award system described in the '736 patent limits the savings only to a single saving mechanism, i.e., retirement account, thus restricting the customer to a single account and away from a multiplicity of investment and saving products available in the market. Another disadvantage of the retirement savings system as described in the '736 patent is directed to the fact that it is based solely on an award which a retailer issues to the customer. In this manner, the customer is prevented from saving and contributing his/her own money as a mechanism which would enhance the saving power of the patronage incentive award system and which would develop a useful saving behavioral pattern of customers.

Thus, a new patronage incentive system, free of drawbacks seen in prior art systems is desired and advantageous to both customers and vendors.

SUMMARY OF THE INVENTION

It is an object of the present invention to provide a method of doing business at both a point of sale as well as in an Internet-based environment by employing a patronage incentive system for developing loyalty of customers to retailers which encourages a customer to save his/her own money each time he/she makes a purchase directly from the retailer or on the retailer's web site, thus increasing the saving power of the system and promoting the loyalty of customers to retailers.

It is another object of the present invention to provide a patronage incentive system offering the customer a diversity of investment products available on the market, thus more fully satisfying the financial goals of the customer and increasing the loyalty of customers to retailers.

It is a still further object of the present invention to provide a patronage incentive system for Internet-based retail businesses in which each participating retailer offers the customer an option to round up the price of the purchase to a rounded dollar amount, whereby the difference of the rounded dollar amount and retail price of the purchase is credited to the customer's personalized account and is then invested into an investment entity approved by the customer.

Another object of the present invention is to provide a "RoundIt.com" icon option at the web site of each participating retailer in order that the customer is provided with the opportunity to increase his/her savings by making purchases at any participating retailer's web site. Since the customer does not have access to each retailer's web site through some centralizing saving program web site, the customer avoids additional fees which would otherwise be charged at the centralized web site. The availability of the "RoundIt" option at each participating retailer's web site increases the saving power of the system and further promotes loyalty of customers to retailers.

It is a further object of the present invention to provide a method of operating a patronage incentive program which is based on willingful small monetary contributions made by customers to the customer's account each time the customer makes a purchase for further investment and earning a return on those monetary contributions.

The present invention may find its utility in any retail business, as well as a financial institution which permits purchase of consumer products or services through use of a credit or debit system such as credit cards, however, the preferred patronage incentive system is envisioned primarily as a method of doing business in an Internet-based client-retailer community. The patronage incentive system of the present invention includes a computer system for interactive communication between customers and retailers and a saving software program interactive with customers through web sites of the retailers for:

(a) rounding up, upon the customer's approval, the retail price of the purchase made during the client-retailer interaction to a rounded price amount (the nearest dollar or some other higher dollar amount), (b) saving the difference between the rounded and the retail prices at an account associated with the customer, and (c) further investment into an investment opportunity available in the market.

The saving software program of the system of the present invention establishes a rounded account for a customer to which the cash value of the difference between the rounded amount and the retail price is credited instantly when the purchase is made or periodically (daily/weekly/monthly) from the retailer's web site. Simultaneously, the saving software program establishes an internal account database in the RoundIt.com web site where all information about the transaction between the client and the retailer as well as interaction between the retailer and the bank or other financial institution are recorded.

The bank or other financial institution in turn deposits the savings into a collective account for periodic investment into a predetermined single mutual fund.

At most investment entities, an account may be opened starting from a certain initial monetary level, thus the saving software program of the present invention has the ability of gathering the savings of a plurality of customers and depositing them into a single account established with the investment entity.

The information about the status of the account with the investment entity, interest earned, etc. is transferred to an internal account database and is recorded in order that upon the customer's request, all information about his/her share in that single account with the investment entity can be submitted to the customer.

The saving software program of the present invention further interacts with a customer through a retailer's home page on which indicia, preferably a RoundIt.com button or icon, is displayed in order that the customer may directly communicate with the saving software program through icon actuation.

The customer is also offered an option to liquidate an account, whereby under a Customer Liquidation Request, the saving software program liquidates the account and issues a refund or withdrawal to the customer, for example in the form either of a check sent directly from the bank to the customer, or as a gift certificate sent to the customer from the retailer, thus encouraging the customer to make a purchase. The method of payment of the refund is subject to the retailer's business practice, sum of money accumulated on the customer's account, etc.

Viewing another aspect of the present invention such is directed to a method of doing business by operating a unique patronage incentive system. The method includes the steps of:
- providing a computer system for interactive communication between customers and retailers over the Internet,
- providing a saving software program having customer interactive indicia at the web site of the retailer,
- initiating contact by the customer with the retailer,
- making a purchase by the customer of a product offered by the retailer at a specified retail price,
- actuating the interactive indicia of the saving software program, to actuate the saving software program to initiate the saving process, which further includes the steps of:
  - (a) rounding up the retail price to a rounded price amount,
  - (b) establishing an account associated with the customer, and
  - (c) crediting the difference between the rounded price amount and the retail price to the account.

It is an important feature of the method that the saving software program of the present invention establishes a personalized account within the saving software program to which a cash value corresponding to the difference between a rounded and retail price is credited and further establishes an internal account database to which information about all transfers is recorded. All credits from the retailer's web site to the savings software program are made either instantly or periodically over a certain period of time (daily, weekly, or monthly).

The bank, under supervision of the saving software program, establishes a single collective account with an investment entity to which savings of all customers are deposited. The software of the present invention monitors the single account with the investment entity, calculates a share of each customer in the single account, and records information about the account status, interest earned, etc. into the internal account database whereby upon the request of a customer, the saving software program can transmit the requested information to each customer.

The method of the present invention further includes the steps of registering each customer to a RoundIt.com web site, as well as having the ability to liquidate an account upon the customer's request, in which case the saving software program issues a refund or withdrawal to the customer in a specified form, depending upon the level of the savings accumulated, either chosen by the computer software program, or by the retailer and approved by the customer. Subsequently, a check or other transaction note in the amount of the refund is issued by the bank and is sent directly to the customer. In some scenarios, such as when the savings of the customer are not sufficient to remove them from the single account with the investment entity, the retailer may possibly issue a gift certificate entitling the customer to make a purchase at the retailer's web site at a later time.

The present invention is also directed to a patronage incentive system which includes a computer system for interactive communication between a plurality of enrolled customers (each having an access to Internet) and at least one participating retailer having a point-of-sale terminal to which a saving software program is integrated.

In order to be enrolled in the patronage incentive system, each customer initiates the enrollment by interacting with the saving software program through the Internet to establish a personal account associated with each customer and to receive a predetermined identifier of such an enrollment to identify customers as the patronage incentive system subscribers. Upon making a purchase by the enrolled customer at the point-of-sale of the participating retailer, the saving software program at the retailer's point-of-sale recognizes the customer as the patronage incentive system subscriber by using the identifier of the enrolled customer, and further:
- rounds up the retail price of the purchased product to a rounded price amount,
- credits the difference between the rounded price amount and the retail price to the personal account associated with each enrolled customer making the purchase, and
- deposits the amount credited to the personal account for the plurality of enrolled customers for a plurality of purchase transactions into a predetermined single mutual fund, where the savings software program establishes a single collective account for all enrolled customers.

Preferably, a collective account with a bank is first established by the saving software program to pool the deposits from the plurality of enrolled customers for periodic investment into a predetermined single mutual fund.

The saving software program serves many functions including:
- serving as the customer relationship means interactively communicating with each enrolled customer through the Internet and transmitting information regarding the personal account associated with each enrolled customer,
- for calculating a share of each customer in the collective account established with a single mutual fund, and for transmission of the information regarding the share to each enrolled customer,
- for calculating and recording amounts to be deposited,
- for displaying amounts to be deposited on the cash register screen at the point-of-sale of the participating retailers,
- for printing out the deposited amounts on the purchase receipt,
- for identifying the transactor, the amount of the deposit, and the date/time of the transaction, and
- for sending the transaction information to a central computer server.

Another aspect of the present invention directs itself to a method of operating a patronage incentive system, which includes the steps of:
- providing a computer system for interactive communication between a plurality of customers and at least one retailer having at least one point-of-sale terminal,
- integrating a saving software program having customer interactive indicia, into the computer system at the at least one point-of-sale,
- initiating enrollment of each of the plurality of customers with the patronage incentive system by interaction of each customer with the saving software program through the Internet to establish a personal account associated with each customer and to provide each enrolled customer with an identification means,
- making a purchase by the enrolled customer of a product offered by the at least one retailer at the at least one point-of-sale thereof in exchange for a retail price;
- actuating the saving software program at the at least one point-of-sale of the at least one retailer by identifying the enrolled customer by the identification means, thereby authorizing the saving software program to initiate the saving process, including the steps of:
  - (a) rounding up the retail price to a rounded price amount,
  - (b) crediting the difference between the rounded price amount and the retail price to the personal account of the enrolled customer, and (c) depositing the amounts credited in the step (b) into a single collective account established with a bank for periodic investment into a predetermined single mutual fund.

Still further, the present invention is directed to a method of doing business in a retail environment, which includes the steps of:

providing a computer system for interactive communication between a plurality of customers and at least one retailer having at least one point-of-sale, integrating a saving software program, having customer interactive indicia, in the computer system at said at least one point-of-sale of the at least one retailer, initiating enrollment of each of the plurality of customers with the patronage incentive system by interaction with the saving software program through the Internet to establish a personal account associated with each customer and to provide each enrolled customer with an identification means, making a purchase by the enrolled customer of a product offered by the retailer at the at least one point-of-sale thereof in exchange for a retail price;

actuating the saving software program at the at least one point-of-sale of the at least one retailer by identifying the enrolled customer by the identification means, thereby authorizing the saving software program to initiate the saving process, including the steps of:

(a) rounding up the retail price to a rounded price amount, (b) crediting the difference between the rounded price amount and the retail price to the personal account of the enrolled customer, and (c) depositing the amounts credited in step (b) to the personal accounts of the plurality of individual customers into a single collective account established with a bank for periodic investment into a predetermined single mutual find.

The present invention further includes a patronage incentive system providing:

a computer system for interactive communication between a plurality of customers enrolled in said patronage incentive system and having access to the Internet, and at least one retailer participating in the patronage incentive system, the customers purchasing a respective product offered by the retailer at least one point-of-sale thereof at a retail price;

a saving software program integrated into the computer system at the at least one point-of-sale of the retailer, the saving software program being interactive with each enrolled customer through the Internet; and a data transmission signal generated by the computer system is sent to a central data base indicating a rounded price amount for each customer transaction, the saving software program establishes a collective single account associated with a bank and transfers the difference between the rounded price amount and the retail price for each respective product purchased by each enrolled customer to the collective single account for periodic investment into a predetermined single mutual fund.

These and other novel features and advantages of this invention will be fully understood from the following detailed description and accompanying Drawings.

DETAILED DESCRIPTION OF THE PREFERRED EMBODIMENTS

Figure 1:
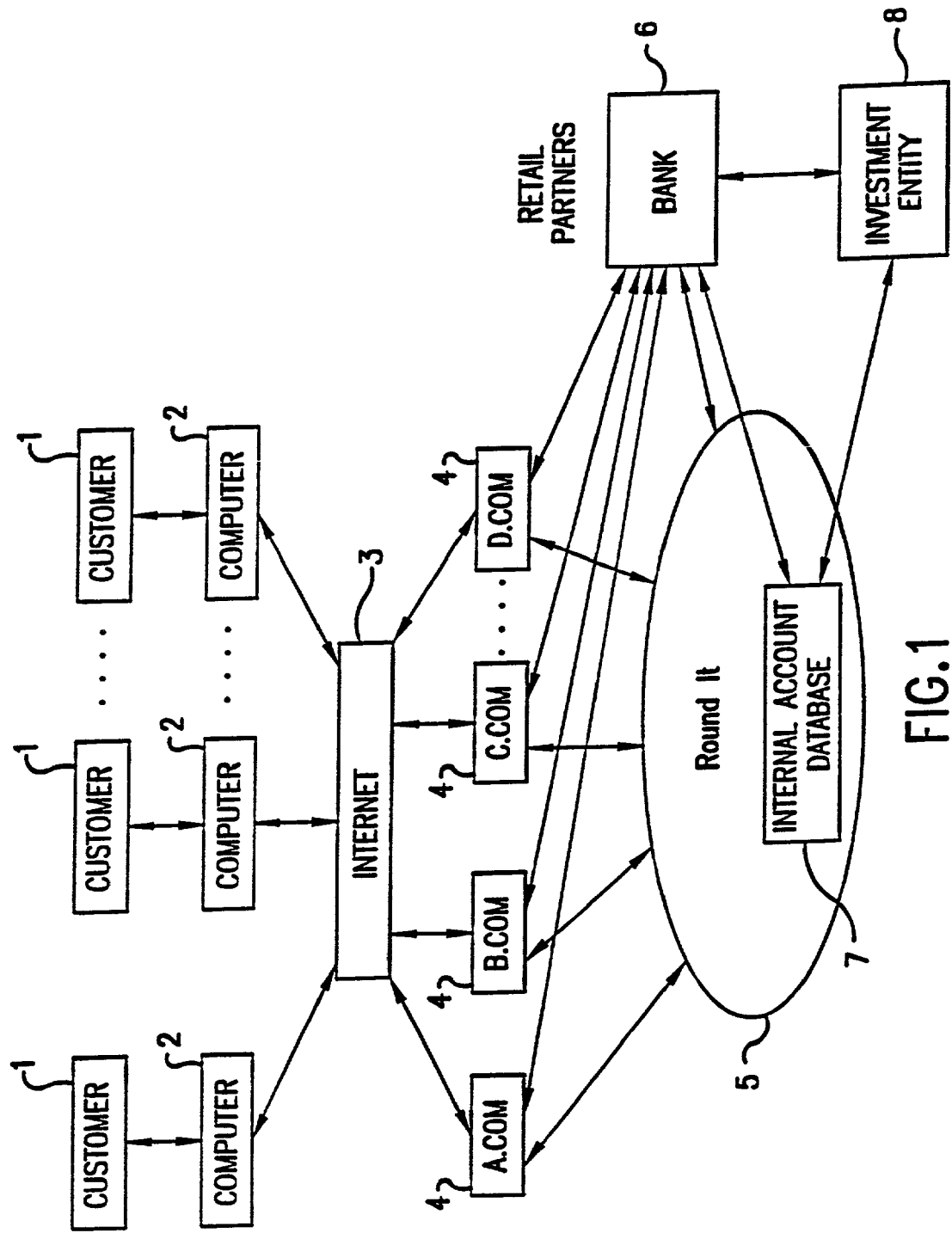
FIG. 1 is a schematic block diagram of a method of doing business among customers and retailers employing the patronage incentive system of the present invention.

Extended market research conducted by the inventors of the present invention has revealed that customers are willing to save a certain amount of money each time they make a purchase by simply rounding up the price of a purchase towards the nearest dollar (or a higher dollar) and saving the change, i.e., the difference between the rounded price and the retail price of purchase.

The system of the present invention has been developed as a computerized system allowing customers making purchases through the Internet to automatically save a certain amount of money associated with each purchase made. The computerized system of the present invention develops a positive habit of saving money and is supported by a general behavioral pattern of people who are willing to save change left from their purchases. Further, the system of the present invention is beneficial to the customers since it provides for investment of the saved money which may increase the return of the savings.

Additionally, the present invention is beneficial to vendors of goods and services where the customers make their purchases since the vendors offer the customers a convenient way to save money and to allow money growth once they make a purchase at the vendors' sites. Thus, the system of the present invention develops a customer loyalty to the vendor where the customer purchases goods or services. The vendors, in their turn, may enhance the saving process of the present invention by adding to a "Round It" saving feature at their web site a particular award mechanism, such as a matching of the saved change, offering a credit to the customer which may be used for further saving, awarding the customer a flat cash payment when the customer attains certain levels of purchase, etc., thus even further promoting customer loyalty to a vendor of goods and services.

To further promote the loyalty of the customers to retailers, the patronage incentive system of the present invention not only allows for the customers to conveniently save money, but also provides a feedback to the customer by reporting, at the request of the customer, the status of the saving account; interest rate; what would be the customer's earnings if he or she continues to make purchases through the retailer using the "Round It" option; what would be the customer's savings if he or she would save a certain amount of money during a month, as well as other saving related parameters.

The system of the present invention is beneficial to a customer since the saved change gains accumulated return immediately even though the transaction saved amount of money would generally not be sufficient to open an account with an investment entity. To allow an individual to customer's saved change to begin working immediately, the savings of a plurality of customers are combined and invested collectively as a single account sufficient enough to gain a return.

The system, when providing a report to a customer, informs the customer with his/her share of the gained return. It is clear that by saving change in ajar as many people are prone to do, they cannot open an account with a mutual fund or be involved in another investment mechanism until a certain amount of money is collected. For many mutual finds, the account can only be opened with an initial investment not less than $500.00-$1,000.00. In contrast to the traditional approach of saving change, the system of the present invention provides for immediate investment and gains returns even with a small amount of the saved change.

Although the computerized patronage incentive system of the present invention is applicable to any purchase process, both Internet-based and traditional shopping, as an example and for the sake of clarity, the patronage incentive system of the present invention will be described as an Internet-based system for the Internet-based retail business involving customers making their purchase over the Internet at retailers' web sites.

Referring to FIG. 1, such shows in simplified form, a block diagram of a method of doing business in the Internet-based customer-retailer community by operating the patronage incentive system of the present invention. A customer 1 initiates contact through a computer 2 with the Internet system 3 and further, via the Internet 3, the customer 1 visits a web site of a retailer where the customer desires to make a purchase.

In the patronage incentive system of the present invention, a plurality of customers 1, as well as a multiplicity of retail partners 4, may participate so that each customer 1 can visit any of those retail partners 4, which are identified in FIG. 1 as A.com, B.com, C.com, and D.com. It is clear that any number of retail partners may participate in the patronage incentive system of the present invention. Each of the retail partners 4 provides to each customer 1 an option of rounding up the purchase price. Upon approval by the customer 1, the Round It purchase cycle 5 is initiated. The purchase price is rounded up to the nearest dollar (or to a higher figure upon the request of the customer), and passes the difference to the bank 6. Simultaneously, when the difference or change is passed to the bank 6, the computer savings program purchase cycle 5 saves data about the transfer in an internal account database 7 maintained in the computer savings program. Upon request by the customer, the computer savings program or RoundIt.com will supply information from the internal account database 7 to the computer 2 of each customer 1.

Although a single bank or institution 6 is shown in FIG. 1, it is clear that a plurality of bank partners may participate in the "Round It" program of the present invention. From the bank 6, the money deposited on the account of each customer 1 is then periodically invested into a predetermined single mutual fund.

Since many mutual funds open an account starting with a certain initial of monetary level (in the range of $500.00-$1,000.00), the initial savings of a single customer may not be sufficient to initiate an account with a mutual fund. Thus, the savings of a plurality of participating customers is collected and collectively invested into a mutual fund as a single account or invested in another investment product available in the market.

Information from the investment entity 8, where the savings of the customer 1 are invested, is submitted to the internal account database 7 in the RoundIt.com, to allow the computer savings program to calculate the share of each customer 1 in the collective single investment account and transfer the information to the computer 2 upon the customer 1 request. The customer 1 may also receive information about prospective savings such as: what will be the return of the saved money at the end of a certain period of time at a present rate of saving as well as the present interest rate, what would be the return if the customer would save a certain amount of money for instance $25.00 or $50.00 a month, etc.

Figure 2:
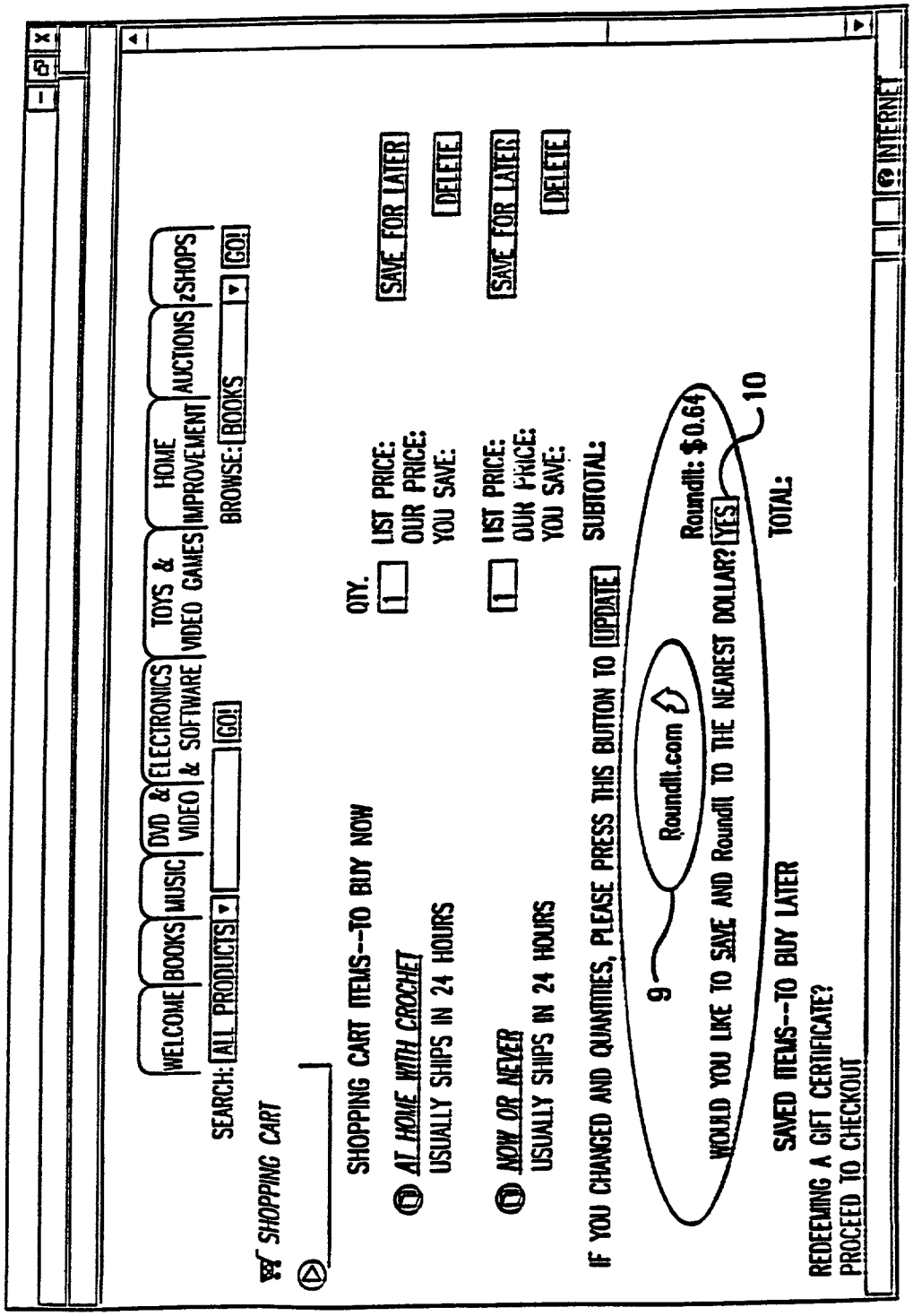
FIG. 2 illustrates a simulated home page of a retailer displayed on the screen of a computer interacting with a customer while the customer makes a purchase on the simulated web site, showing the "RoundIt.com" option offered to the customer.

Referring to FIG. 2, such shows the home page of a typical site (as one of participating retail partners), a "Round It" option is presented thereon for interaction with the purchasing customer. When the customer visits the simulated web site (or any other participating retailer's web site), the customer is offered, upon making a purchase, a "Round It" option presented by RoundIt.com button 9, in which the question is asked: "Would you like to save and round it to the nearest dollar?" If the customer 1 approves, he/she points at the "Yes" button 10 so that the computer program purchase cycle 5 (best shown in FIG. 1) proceeds as discussed in previous paragraphs and as will be further discussed in detail with reference to the Core Process, the Customer Purchase Process (FIG. 4), and the Customer Service Process (FIG. 5) of the saving software program of the present invention.

Figure 3:
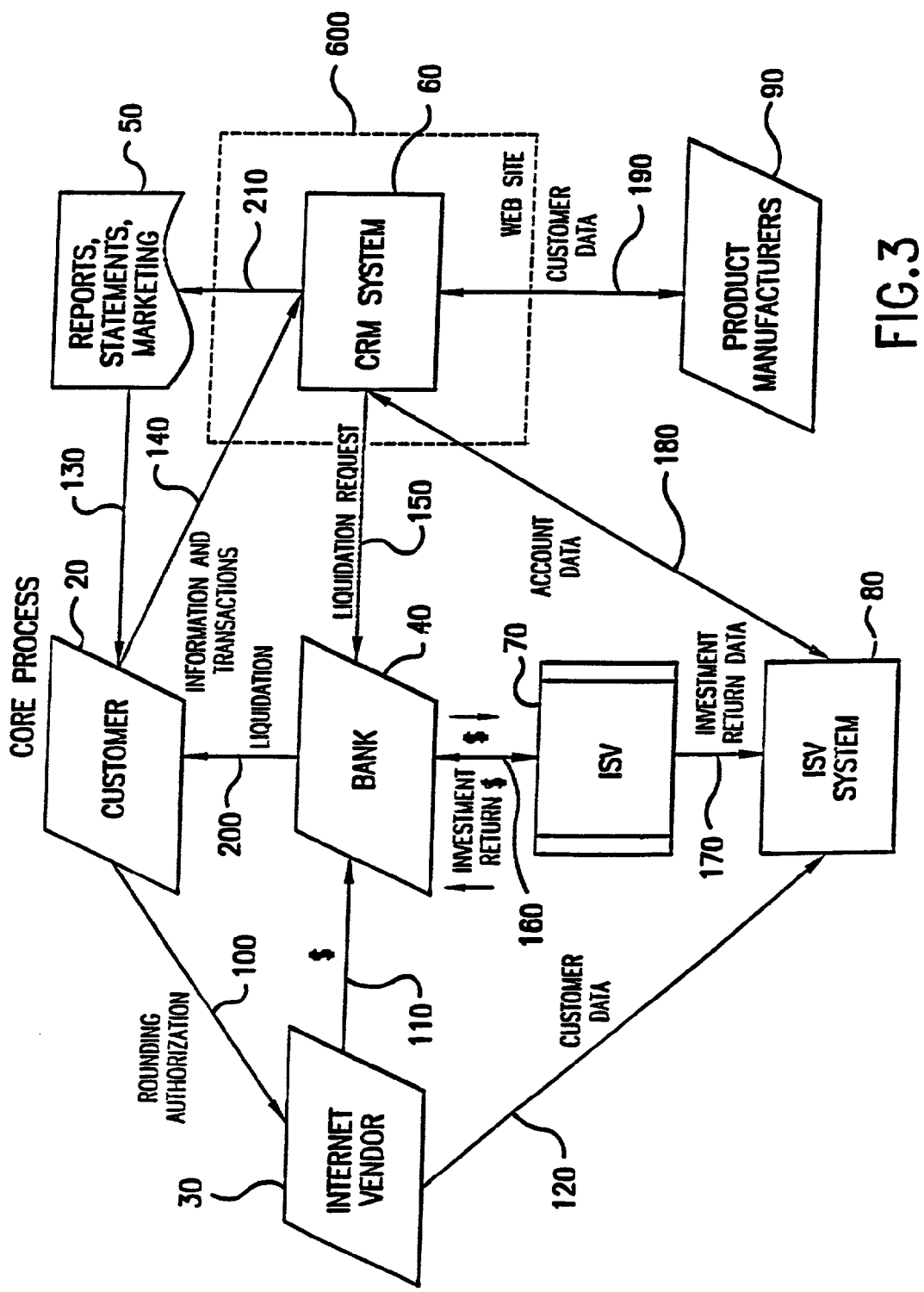
FIG. 3 is a flow chart diagram of a core process of the patronage incentive system of the present invention.

Referring to FIG. 3, a flow chart is provided with the block 20 in which the customer authorizes the "Round It" purchase cycle. The data corresponding to the rounding authorization is supplied from the block 20 over line 100 to block 30 "Internet vendor", which is also referred to as a "retail partner" herein. In block 30, the computer savings program process rounds the price of purchase up to the nearest dollar or to a higher figure, charges the rounded amount from a credit card or from other financial information submitted by the customer, and sends the actual change, i.e., the difference between the rounded and the real price, to block 40 "Bank".

Simultaneously, the customer data is sent along line 120 from the block 30 into block 80 "ISV (initial saving vehicle) system". Block 80 represents an internal account database that is maintained at RoundIt.com in which the data representative of the status of the customer's account (balance, interest earned, investment returned, etc.) is recorded. On line 110, the transfers from block 30 to block 40 may possibly be made in two modes:

(a) as bulk transactions of all the "Round It" amounts from a particular vendor collected at the vendor's site over a predetermined period of time, and (b) as a stream of single immediate transactions.

Block 80 feeds, via line 180, the account data into the customer relation management system, also referred herein as CRM system 60 in order to store generalized information about the customer, while the ISV system (block 80) contains detailed information about the customer. The generalized information about the customer contained in the CRM system in block 60 is used when the customers request general information about themselves and their account.

In addition, the CRM system in block 60 provides several other functions, for example, the data from the CRM system in the block 60 over the line 210 are fed to the block 50 in which reports, statements, and marketing messages are created for being sent via e-mail and/or as paper-based messages to the customer (block 20) via line 130. Optionally, the CRM system in block 60 may produce the reports, statements, etc. through another process, for instance, actually printing and mailing them to the customer.

In block 50 shown in FIG. 3 which illustrates a core process of the computer savings program, an option is provided to the customer with 24-hour access to the information about the customer account to allow access to the status of the account and to receive information about the interest earned, the return earned over a certain period of time, and advice as to what earnings may be received from the investment if a customer achieves a greater savings rate.

Figure 5:
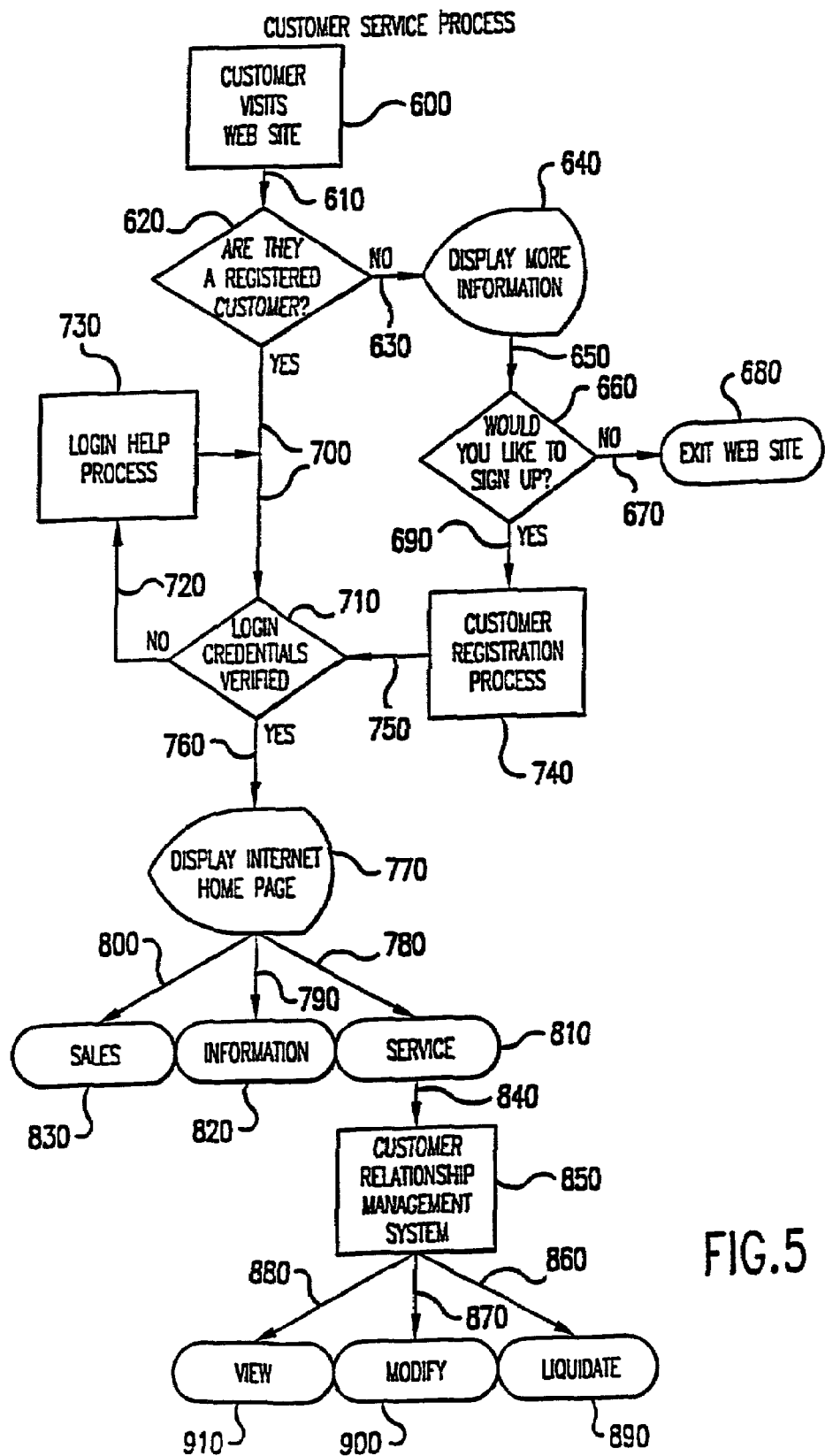
FIG. 5 is a flow chart diagram of the customer service process of the patronage incentive system of the present invention.

Another option of communicating between block 20 and block 60 may be implemented through the "Information and Transactions" line 140 which fulfills the customer service process as will be disclosed in further paragraphs with regard to FIG. 5.

In the CRM system of the block 60, the customer is offered the option to purchase additional products through the computer savings program, such as mutual funds or insurance products. These products are provided by external partners (investment entities) represented in block 90 "Product Manufacturer". Thus, block 90 represents other insurance companies, banks, or financial services companies that exchange customer data such as balances, name, address, phone number, etc. through line 190 to the block 60. Since block 90 represents multiple product manufacturers, the line 190 includes a plurality of lines, each for a single manufacturer.

In addition to the function of the CRM system discussed in the previous paragraphs, block 60 may generate a liquidation request in response to the liquidation request initiated by the customer in block 20 and transmitted through line 140 to the block 60. The CRM system in block 60 sends a liquidation request via the line 150 to the bank in block 40. In response to the liquidation request received through line 150, the bank in block 40 extracts the money from the computer savings program account and sends a liquidation data via line 200 back to the customer in block 20. The liquidation may be in the form of a check, an electronic transaction via credit card, or may be in the form of a gift certificate from a vendor. The transaction into the customer block 20 is initiated by the bank in the block 40.

After the cash from the rounding up procedure is deposited into the bank in block 40 via line 110, the bank may invest the money into an ISV (initial savings vehicle) in block 70. The initial savings vehicle may be a money market find or a mutual fund. The bank submits money to the partner that provides the service. As an example, when investing in a mutual fund, the bank may send cash to the ISV in block 70 for deposit into an investment account.

The ISV in block 70 sends the investment return back to the bank in block 40 via line 160 to deposit the investment return into the "Round It" account in the bank in block 40. In addition, the ISV in block 70 sends the data concerning the investment return (for example, the percentage of return that was received, on an amount on a daily/weekly/monthly basis, etc.) via line 170 to the ISV system in block 80 to calculate the appropriate amount of interest or investment return for the customer.

Each customer will only have an account in the ISV in block 70 or with the product manufacturers in block 90 through the computer savings program. This allows the customer savings to begin gaining a return immediately, even when the saving amount of each customer is not sufficient to open an account with a mutual fund or to buy an insurance product. Thus, in the patronage incentive system of the present invention, money saved by a number of customers are gathered and deposited into a mutual fund as a single deposit by using a master feeder system which has been implemented by a few companies, for example, SaveDaily, etc., which creates a single omnibus account that represents all of the "Round It" program users. When a single combined deposit in the mutual fund is made, the computer savings program, in the ISV system in block 80 determines how much of that mutual fund each customer owns.

Figure 4:
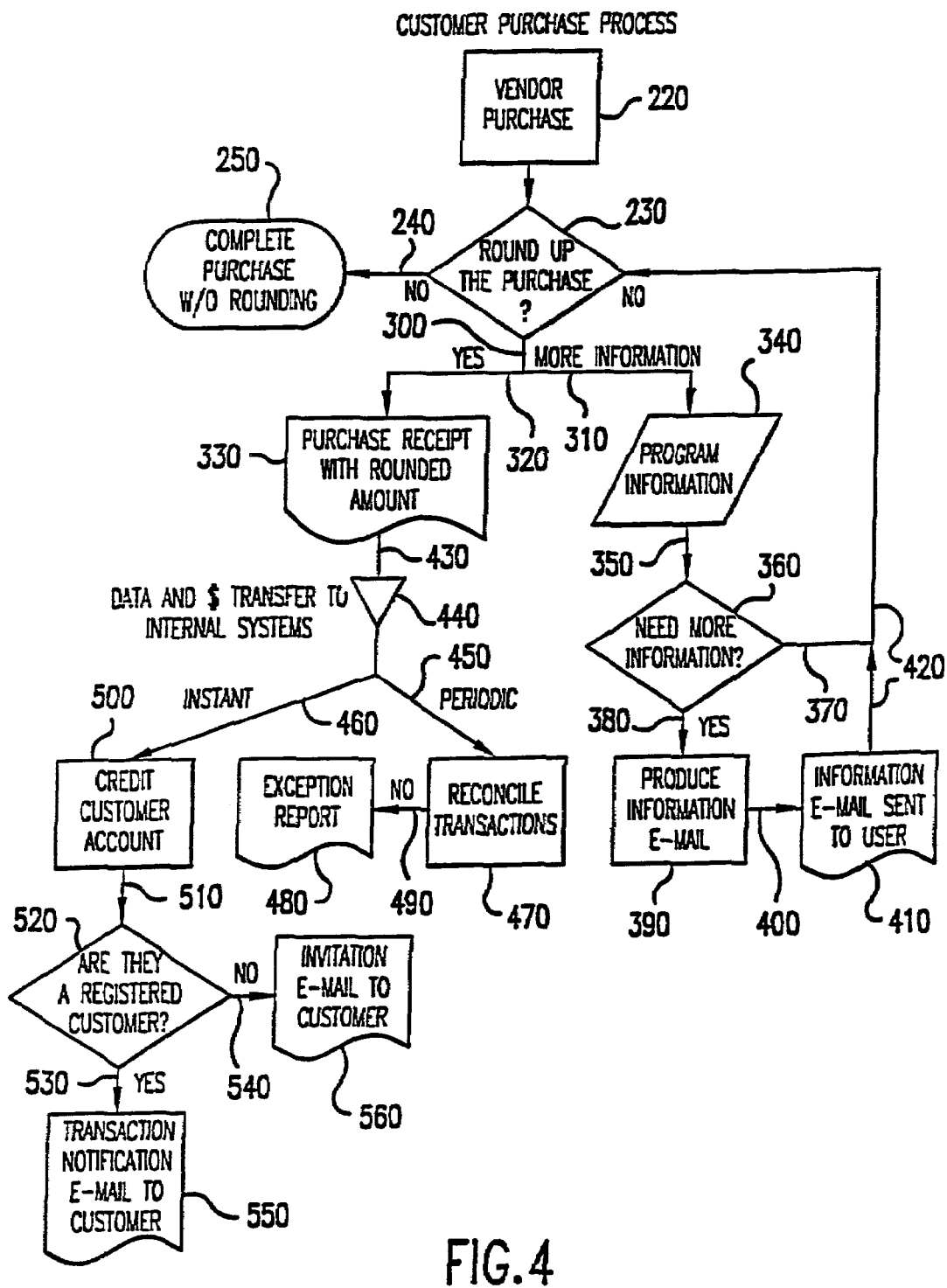
FIG. 4 is a flow chart diagram of a customer purchase process of the patronage incentive system of the present invention.

Turning now to the customer purchase process, illustrated in FIG. 4, a customer visits an internal web site of a retail business and makes a purchase at the vendor's web site in block 220. At that point, the customer is offered an option to round up the price of purchase as represented in decision block 230 which is also shown in FIG. 2. If the answer to decision block 230 is "No", the flow chart passes through the line 240 to block 250 "Complete Purchase Without Rounding". Then, the customer continues the purchase process via the vendor's web site without actuation of the present invention system.

If, however, in decision block 230 the customer decides to round up the purchase, and the answer is "Yes", the flow chart passes via line 300 either to line 320 "Yes" following into block 330, or to line 310 "More Information" following into block 340 "Program Information", depending on whether the customer agrees to round up the purchase (line 320) or the customer needs more information (line 310).

In block 340 the program prepares examples and instructions for the customer on what the computer savings program can accomplish for them, for example, how to sign up and basic information about the RoundIt.com and its services.

From block 340, the logic flows directly through line 350 into decision block 360 "Seed More Information?". Thus, in decision block 360 customers are provided with an option to decide if they have enough information about the program, or whether more information is needed. If the customers need more information, they would click a "Yes" button on the screen of the computer, and the logic will flow through line 380 into block 390 in which the program will internally produce information e-mail which is transmitted through lines 400 into block 410 in which the internal e-mail submitted from block 390 is translated into the actual e-mail which is sent via the Internet to the customer in order to allow the customer to make a final decision in block 230.

If, however, in decision block 360, the customer decides that at this point enough information has been obtained, the logic then flows via line 370 and further through line 420 to block 230.

If in decision block 230 the customer decides that at this point he/she approves the round-up of the purchase, i.e., the customer selects "Yes", the logic flows over line 320 to block 330 "Purchase Receipt with Rounded Amount", which then produces a receipt either via the screen on the computer or by any other method the vendor prefers to use with a rounded amount. The purchase process is then completed in block 330.

From block 330, the flow chart procedure passes through line 430 into data transfer block 440 in which data and cash transfer occurs from the vendor to the computer savings program and the core process (discussed in previous paragraphs and shown in FIG. 3) begins. From the data transfer in block 440, data and cash transfer are conducted over two transmission lines: line 460 "Instant" and line 450 "Periodic".

With respect to line 460, instantaneously upon a purchase and the receipt issued in block 330, cash and data from block 440 are sent into block 500 "Credit Customer Account", which credits the account at the "Round It" facility in the ISN in block 70 (shown in FIG. 3) and into internal account database 7 (shown in FIG. 1). At this point, the computer savings program account reflects that the customer has made a deposit.

From block 500, the data flows through line 510 into decision block 520 "Are You a Registered Customer?". If a customer is a registered customer, i.e., the answer is "Yes", the logic flows through line 530 to block 550 "Transaction Notification E-mailed to Customer", which generates an e-mail notification to the customer that says "You have deposited a specified amount into your "Round It" account." At this point, the process representing an instant deposit is completed.

If in decision block 520, the customer is not a registered customer, i.e., the answer is "No", data flow passes from block 520 via line 540 into block 560 "Invitation E-mailed to Customer". Block 560 generates and sends out to the customer via e-mail, an invitation, "You have deposited a specified amount into your account. Please, visit the web site to register your account and become an active participant." The e-mail sent from block 560 ends the process of the instant deposit until the customer again initiates it.

Returning to data transfer block 440, the data may be transferred periodically over line 450 "Periodic". In this periodic portion of the flow chart of the Customer Purchase Process, a periodic interval is determined—daily, weekly, monthly—and data transmission takes place from the vendor that has a listing of all transactions they have made with the "Computer savings" program, a listing of all of the customers and their transaction amounts.

Thus, data flowing through line 450 into block 470 "Reconcile Transactions", represents an internal process that reconciles the account similar to a checkbook analysis. If in an instant notification the "Computer savings" program receives information that someone has deposited an amount of cash, and in the periodic reconciliation process in block 470, it is noted that the customer did not, or the "Round It" account has never received an instant transaction, the process flows from block 470 over line 490 "No", to block 480 "Exception Report".

Referring to FIG. 5 illustrating a customer service process, the data flow is initiated in block 600 "Customer Visits Web Site", either through its invitation from e-mail from the Customer Purchase Process (block 560) or upon the customer's own initiative to visit the RoundIt.com web site. In block 600 (which is also shown in FIG. 3 of the Core Process), there resides a multitude of information such as what products and services computer savings program offers, company information, investment information, and so forth. This information may come from block 410 of the Customer Purchase Process, or an invitation may come from block 560 of the Customer Purchase Process (FIG. 4) in order to initiate a customer visiting the RoundIt.com web site.

When visiting the RoundIt.com web site in block 600, the customer is able to view information that typically can be seen on a web site. However, a key feature of the RoundIt.com will be a button or other actuation mechanism that asks the customer to register or to log in corresponding to decision block 620, "Are you a registered customer?", to which the flow chart passes from block 600 through line 610. Based on a user name and password, an e-mail address, or some other information, the computer savings program determines if a customer is a registered customer. If in decision block 620, the logic determines that the customer is not a registered customer, i.e., the answer is "No", the data flow passes over line 630 into block 640 which then displays more information.

This information may include more information about the company or information about the product that the RoundIt.com is offering. This information is displayed strictly on a RoundIt.com web page. At this point, the logic flows from block 640 through line 650 into decision block 660, "Would you like to sign up?" If the customer does not wish to sign up, i.e., the answer is "No", the logic flows through line 670 into block 680 "Exit Web Site", which then exits the web site with the message "Thank you" and possibly with an option to go to another web site.

If however in block 660 the customer makes a decision to sign up, i.e., the answer is "Yes", the logic flows over line 690 to block 740 "Customer Registration Process", which is a registration process similar to signing up for an account for a credit card where the RoundIt.com would gather personal information such as name, address, city, state, zip code, phone, e-mail of the customer, and any other information required to initiate a Round It account.

User name and a password would also be assigned at that point, which would then flow over line 700 to decision block 710 "Log-in Credentials Verified". The logic verifies in block 710 a user name and/or an e-mail address, which would be the customer's personal account identifier, and a password or PIN number which would then allow the customers to access their account.

At this point, it is beneficial for a clear explanation to go back to decision block 620 which asks whether the customer is a registered customer. If the customer is a registered customer, i.e., the answer is "Yes", the logic flows from the block 620 over the line 600 into the decision block 710. If the user's name and password are not acceptable, i.e., the answer is "No", the logic flows from decision block 710 through line 720 to block 730 "Log-In Help Process", which would then help the customer define the problem, verify the password and user name, etc.

When the problem is defined, the logic flows back through line 700 to decision block 710 and once again asks for the user's name and password. If in block 710, the user's name and password are verified and are correct, i.e., the answer is "Yes", the software passes through line 760 into block 770 "Display Internet Home Page", which again displays a home page for the customer.

In block 810 "Service", customer service related information is displayed, such as a way to contact the company to ask questions about their account, or to initiate some other functions of the "Computer savings" program presented in boxes 890, 900 and 910 discussed in following paragraphs.

In block 820 "Information", information is presented, such as account balance and interest earned, or investment return earned, basic account information, etc. In block 830, "Sales", the information on what purchase the customer made and the amount of purchase is presented. Thus, block 770 represents options to the customer to obtain requested and needed information. If the customer desires information contained in block 830, he/she will direct the logic from block 770 through line 800 to block 830. For information contained in block 820, the logic will flow through line 790 from block 770, and obtains information contained in block 810, the logic flows from block 770 through line 780.

From block 810, the process passes via line 840 to block 850 "Customer Relationship Management System" (which corresponds to block 60 of the Core Process (shown in FIG. 3). The Customer Relationship Management System includes all the customer information. Within block 850, the "Computer savings" program offers a customer several options. If the logic flows from block 850 through line 880 to block 910, the customer is provided with the option to view more detailed information about the customer's account, for example, the interest earned, the rate of return, etc. If the logic flows from block 850 through line 870 to block 900 "Modify", the customer is provided with the option to modify their information, such as change their address, change any password, financial information that they require to be changed, etc. If the program from block 850 passes through line 860 to block 890 "Liquidate", the customer is able to determine whether or not he/she wants to liquidate their account. At that point, the customer initiates a liquidation request which was described in the previous paragraphs with respect to the Core Process of the "Computer savings" program, to issue a check, a gift certificate, etc., to the customer.

As has been disclosed in previous paragraphs, the patronage incentive system and method for retail businesses as provided in the subject Patent Application, is applicable not only to the Internet sites, but also to standard "brick-and-mortar" commercial business practices. At the time that the product or service is purchased from a store, restaurant, or any other traditional business, the buyer, similar to the Internet-based retail business, indicates or is asked, at the place where he/she acquires goods or services, whether the participation in the patronage incentive program of the present invention is desired by the buyer. If the buyer wishes the purchase to be "rounded up" to the next even figure, the retailer electronically transmits to a computer server a signal indicative of a rounded price amount for the buyer transaction and the retail price of the purchase. If the buyer has an account, established with the patronage incentive system, then a savings software program of the patronage incentive system of the present invention credits the difference between the rounded price amount and the retail price to the account. If the buyer does not have an account, the savings software program of the patronage incentive system establishes an account associated with the buyer, and then credits the difference between the rounded and the retail price to the newly established account. The manner and mode of the electronic transfer may be through the Internet, electronic means, such as commonly used in credit card transactions, or other mechanisms not important to the incentive concept as herein described.

Figure 6:
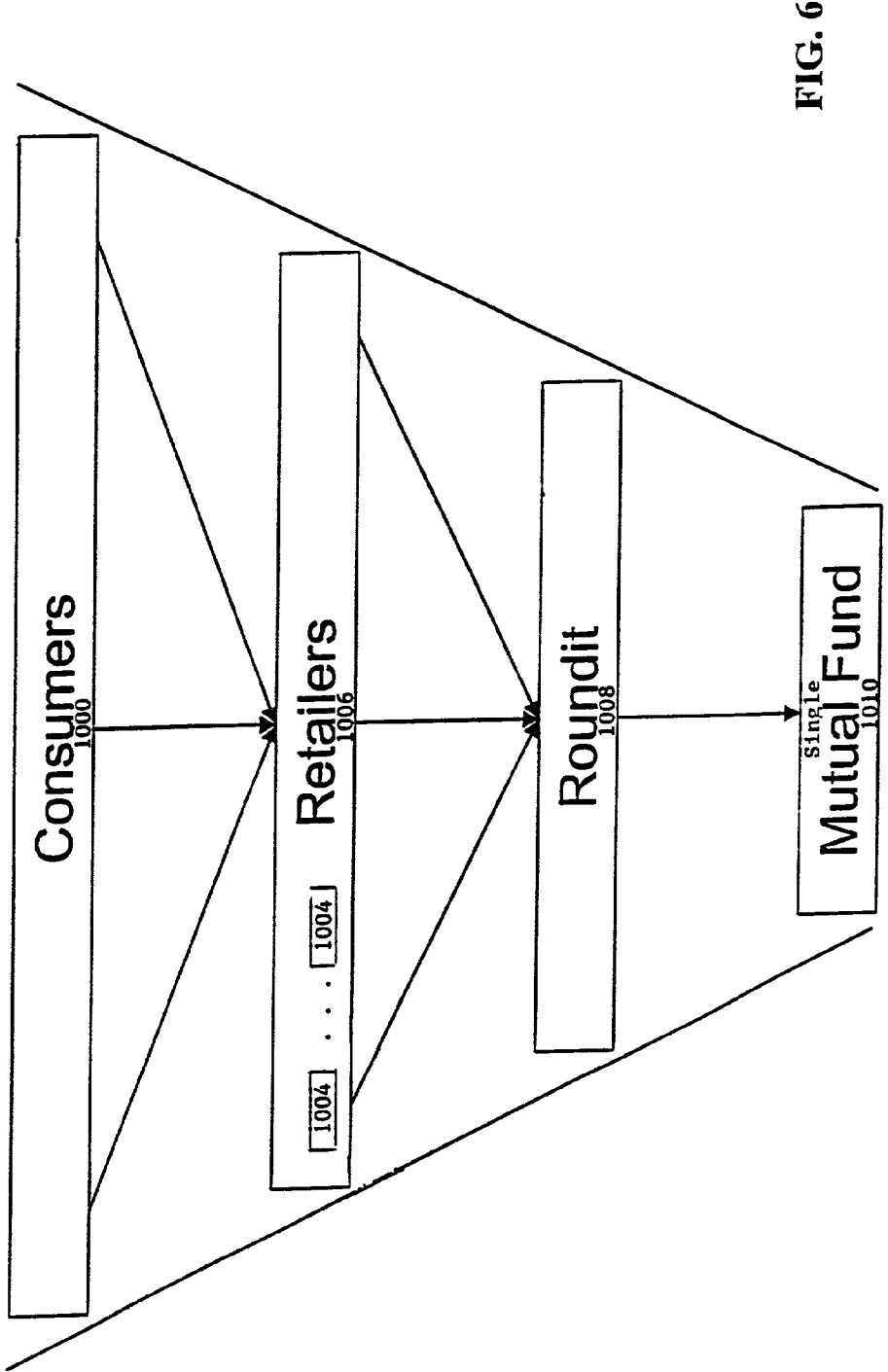
FIG. 6 is a simplified block diagram of the core process of a method of doing business among customers and retailers employing a further aspect of the patronage incentive system of the present invention.
Figure 7:
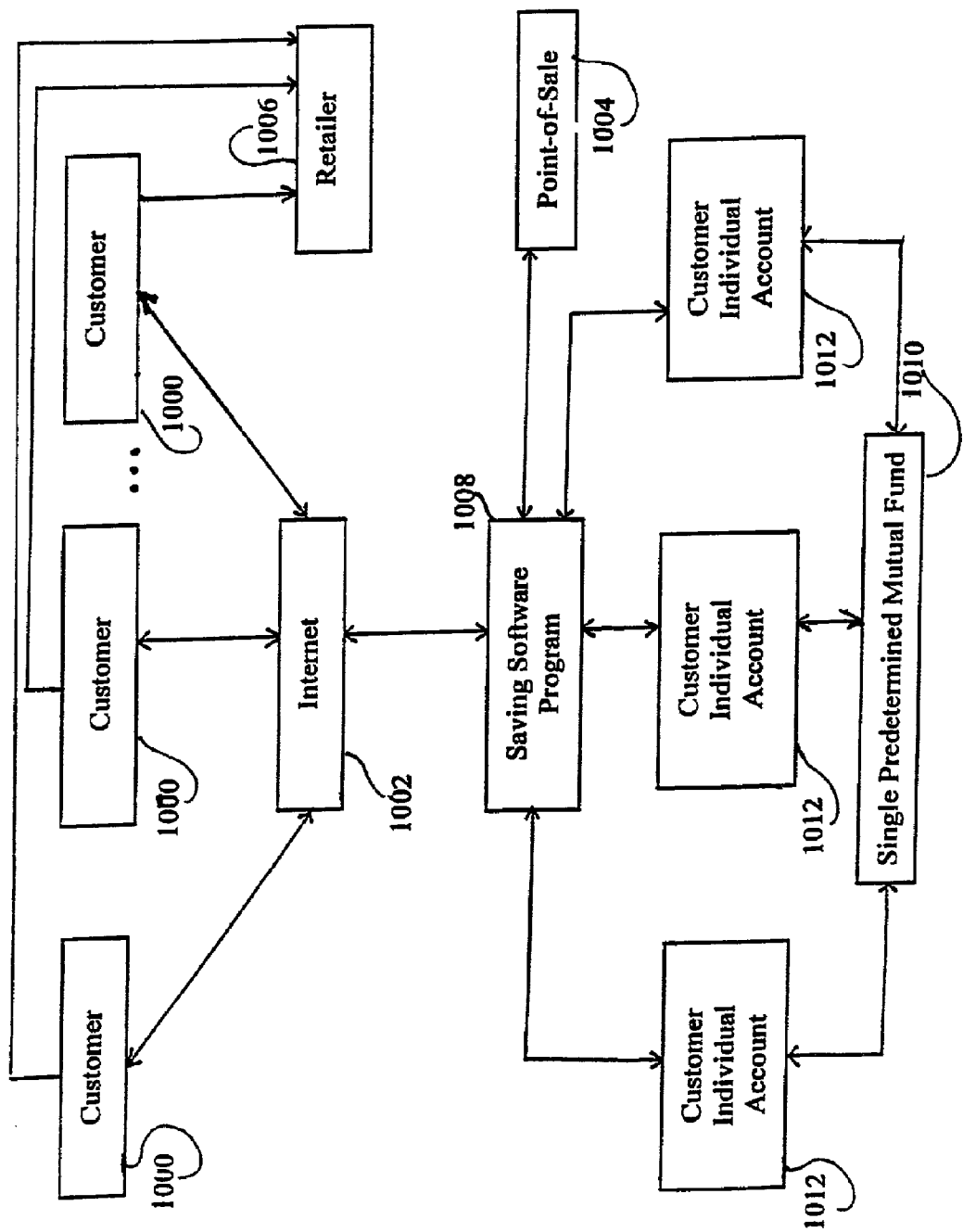
FIG. 7 is a schematic block diagram of a further aspect of the method of doing business among customers and retailers employing the patronage incentive system of the present invention.
Figure 8:
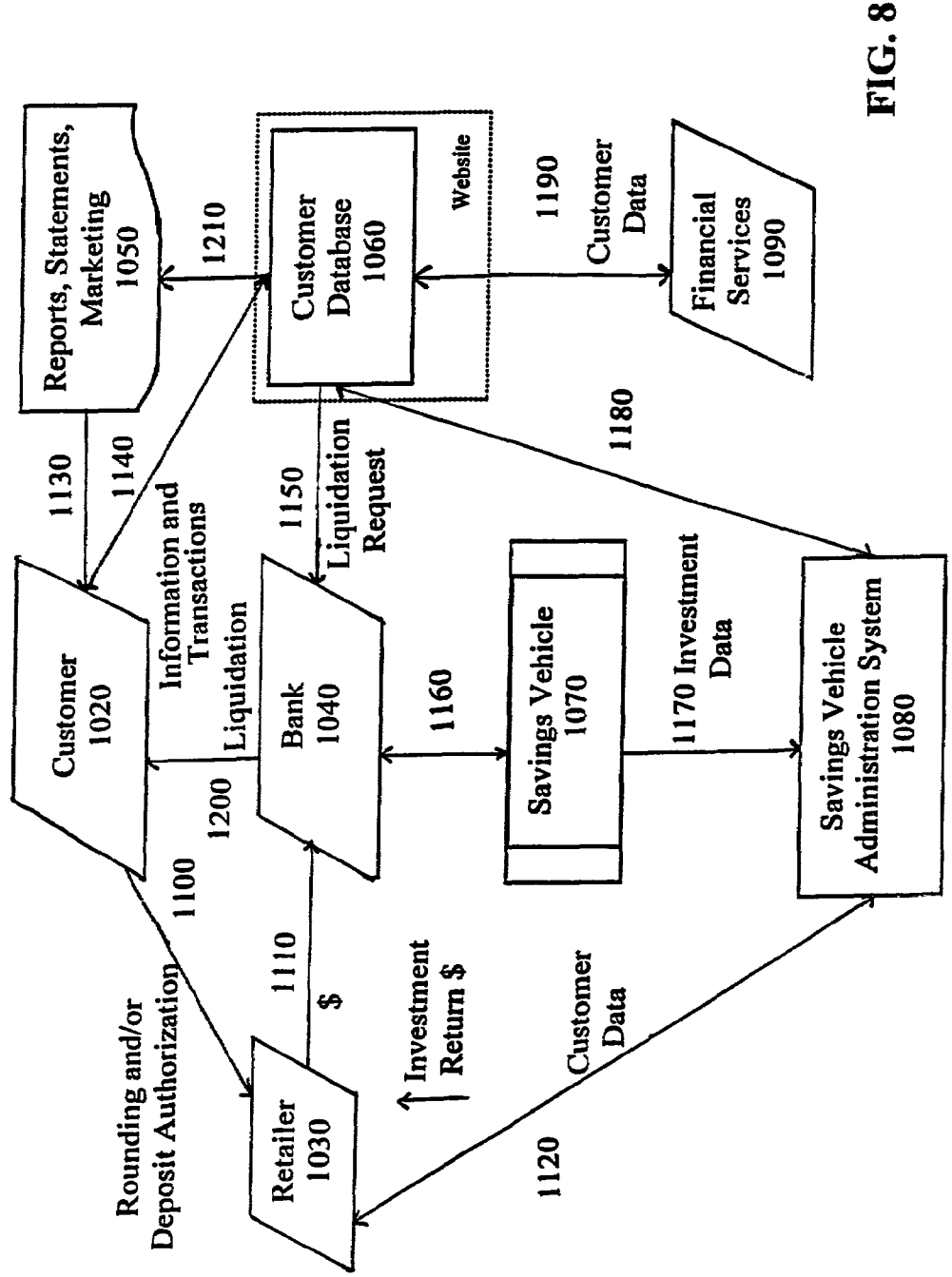
FIG. 8 is a flow chart diagram of the data processing in accordance with the patronage incentive system of the present invention.

Referring to FIGS. 6-8, representing a further aspect of the patronage incentive system being used in a retail environment, the customers 1000 having access to the Internet 1002 make purchases at a point-of-sale 1004 of participating retailers 1006 in order that a saving software program 1008 (further also referred to as "Round-it" program) integrated into the point-of-sale 1004 of each participating retailer 1006, recognizes the customer making the purchase as the patronage incentive system subscriber. The program rounds up the retail price of the purchased product to a rounded price amount, credits the difference between the "Round-it" price amount and the retail price to personal account associated with each enrolled customer 1000 making the purchase, and on a periodic basis, deposits the amounts credited to the personal accounts 1012 of the plurality of enrolled customers (for the duration of a certain pre-established time period) into a collective single account established with a bank for periodic investment into a single mutual fund 1010.

Thus, as best shown in FIGS. 6 and 7, the core process begins at the point-of-sale terminal 1004 of participating retailers who are connected to the "Round-it's" savings network. By using a merchant's Loyalty/Bonus card, "Round-it" savings card, or other unique identifier (the shoppers who have Internet access may "round up" their purchase price to the next dollar amount or higher. The amount rounded along with any additional amounts (hereinafter collectively referred to as "deposits"), then is credited electronically to a personalized on-line "Round-it" account with the actual money deposited pooled with the deposits from other subscribers and invested automatically into the single mutual find account 1010.

The "Round-it's" saving system is integrated into the point-of-sale software of retailers belonging to the "Round-it" network. The point-of-sale software integration is a custom operation that reconfigures any retailer's existing system to be capable of:

(a) calculating and recording "Round-it" deposit amounts,
(b) displaying "Round-it" deposit amounts on the cash register screen;
(c) printing out on the purchase receipt "Round-it" deposit amount;
(d) identifying the transactor, the amount of the deposit, and the date/time of the transaction; and
(e) sending the transaction information to "Round-it's" central computer server.

The "Round-it's" network is an open system designed to connect to all customer transactions including credit card purchases, and may include:

customer/subscribers, who have both Internet access, as well as some means of identifying themselves as being enrolled in the "Round-it" program;

a plurality of affiliated retailers/partners who enter/transmit data, receive "Round-It" deposits, market the program and refer subscribers to other retailers and to the "Round-it's" network;

a central clearing house, that enrolls subscribers on-line, processes deposits, provides customer service and manages all account activity; and a single mutual fund 1010 that serves as the saving vehicle into which all "Round-it" transactions are deposited.

To enroll into the "Round-it's" open savings network, customers may go on-line to activate an account and to agree to receive all correspondence via email as well as conduct all account activity over the Internet. Once an account is activated, subscribers may use either an affiliated merchant's Loyalty/Bonus card, a "Round-it" saving card, or any other identifier to make "Round-it" deposits at all network locations.

Fundamental to the "Round-it" process is the ability to identify customers as "Round-it" subscribers. In this regard, each "Round-it" subscriber is assigned a unique identifier so that the date/time, amount rounded, and the identity of the "Round-it" network subscriber can be recorded and sent to the "Round-it's" central server for account crediting.

Blending the best of both the "brick-and-mortar" and Internet worlds, "Round-it" process offers subscribers the opportunity to make deposits in conjunction with any customer transaction within the "Round-it" network, while providing the convenience of conducting all account activity on-line. In this regard, round-it is a paperless system. Subscribers may enroll, receive all account statements and manage all account activity on line. As such, "Round-it" offers limitless ways, means and locations for making deposits and allows subscribers to access/manage their account exclusively through the Internet.

When subscribers make a deposit, the date/time, amount rounded plus additional amounts and the identity of the "Round-it" subscriber are captured at the point-of-sale 1004 of participating retailer 1006. This information then is sent to the "Round-it's" computer server where it is posted on the subscriber's personal on line account as an amount credited. From this point forward, "Round-it" savings/investment process is fundamentally unique in three important ways:

Omnibus account. Although deposits are recorded and credited to individual subscriber accounts, all "Round-it" payments are collected and pooled daily into one omnibus account. "Round-it" then capitalizes on the combined purchasing power of the collective subscriber pool forming a virtual "Buyer's Club". By pooling the change of the entire subscriber network, minimum deposit thresholds are avoided and subscribers are provided the means to easily, conveniently, and randomly contribute small amounts of money into an investment fund not readily affordable to them before.

Single investment fund. "Round-it's" open network offers subscribers a wide range of ways to randomly deposit variable amounts of small change into their individual "Round-it" account. However, there is only one fund into which all subscriber deposits are invested. In this regard, there are no choices, options, or substitutes. As a condition precedent to the "Round-it" subscriber, customers must agree to participate in a simple investment strategy of depositing their change into one predetermined mutual fund.

Account information. Although the change of the entire subscriber network is collectively invested into one mutual find, each subscriber is able to track and monitor his or her own personal account activity. To provide for this, "Round-it" manages personal accounts on-line recording all deposits and investments as well as computing daily rates of return for each subscriber account. In this regard, all "Round-it" deposits are collectively invested into one master mutual fund account, while personal account information is calculated, maintained and available separately for each "Round-it" subscriber on-line.

Specifically as shown in FIG. 8, a flow chart is provided which begins with the block 1020 in which the customer authorizes the "Round-it" purchase cycle by submitting the identifier at the point-of-sale of the retailer and by approving and authorizing the rounding process. The data corresponding to the rounding authorization is supplied from the block 1020 over the line 1100 to block 1030 "Retailer" which is a participating retailer having a point-of-sale terminal with the "Round-it" program integrated into the point-of-sale software of the retailer. In the block 1030, the computer savings program of the present invention rounds the price of purchase up to the nearest dollar or to a higher figure, charges the rounded amount from a credit card or from other financial information submitted by the customer, and sends the actual change (the difference between the rounded amount and the retail price) to block 1040 "Bank" over the line 1110.

Simultaneously, the customer data is sent from the block 1030 along line 1120 to the block 1080 "Savings Vehicle Administration System", which represents a data base in which the data representative of the status of the individual customer's account (balance, interest earned, investment returned, etc.) is recorded.

On line 1110, the transfers from the block 1030 to the block 1040 may be made in two modes:
(a) as bulk transactions of all the "Round-It" amounts from a particular retailer over a predetermined period of time, and
(b) as a stream of single immediate transactions.

Block 1080, via line 1180, supplies data to the block 1060 "Customer Data Base" in order to store generalized information about the customer, while block 1080 contains detailed information about the customer. The generalized information about the customer, contained in the customer data base 1060, is used when the customers request general information about themselves and their individual accounts over the Internet.

In addition, block 1060 provides several other functions, such as, for example, the data from the customer data base 1060 is provided over the line 1210 to the block 1050 "Reports, Statements, Marketing" in which reports, statements and marketing messages are created for being sent via e-mail to the customer (block 1020) via the line 1130.

In block 1050, the customer can access the information about the customer account on the 24-hour basis to allow access to the status of the account and to receive information about the interest earned, the return earned over a certain period of time, and advise as to what earnings may be received from the investment if a customer achieves a greater savings rate.

Another option of communicating between block 1020 and block 1060 can be implemented through the information and transactions line 1140 which fulfills the customer service process.

The block 1060 is connected to block 1090 "Financial Services" via the line 1190 "Customer Data" for exchanging customer data such as balances, name, address, phone number, etc.

In addition to the functions of the customer data base 1060, this block may generate a liquidation request in response to the liquidation request initiated by the customer in block 1020 and transmitted through the line 1140 to the block 1060. Then, the customer data base in block 1060 sends a liquidation request via the line 1150 to the bank in the block 1040. In response to the liquidation request received through the line 1150, the bank in block 1040 extracts the money from the computer savings program account and sends liquidation data via the line 1200 back to the customer in block 1020. The liquidation may be in the form of a check, an electronic transaction via credit card, or may be in the form of a gift certificate from a retailer. The transaction into the customer block 1020 is initiated by the bank in block 1040.

After the cash from the rounding up procedure is deposited into the bank in block 1040 via line 1010 for a plurality of individual accounts (for each enrolled customer), the bank transfers the money for periodic investment into the single mutual fund 1070 which serves as a saving vehicle for this alternative patronage incentive system of the present invention. For this purpose, the "Round-it" program establishes a cumulative (or collective) single account with the single mutual fund, and the deposits from the plurality of credited personal accounts associated with a plurality of enrolled customers are transferred thereto.

The "Round-it" program in block 1070, sends the data concerning the investment return (for example, the percentage of returns that was received, on an amount of a daily/weekly/monthly basis, etc.) via the line 1170 to the block 1080 to calculate the appropriate amount of interest or investment return for the customer. Additionally, the program in block 1070 sends the investment return back to the bank in block 1040 via line 1160 to deposit the investment return into the "Round-it" account in the bank in the block 1040.

The cumulative account established with the single mutual fund in the block 1070 allows the customer's savings to begin gaining returns immediately even when the saving amount of each customer is not sufficient to open an account with a mutual fund. Thus, in the patronage incentive system of the present invention, money saved by a number of customers are gathered and deposited into the mutual find as a single deposit by using a master feeder system which has been implemented by a few companies, for example, Save Daily, which creates a single omnibus account that represents all of the "Round-it"

program users. When a single combined deposit in the mutual fund 1070 is made, then the computer saving program in the block 1080 determines how much the share of the mutual fund each customer owns.

The method of doing business by employing a unique patronage incentive system of the present invention:

- creates an innovative, efficient Internet based loyalty program;
- redefines the way how customers save according to "Pay yourself first every time you buy";
- offers simple short and long-term savings options;
- provides customers with convenience, reliability and value;
- allows customers to round up their purchase price to a dollar amount after establishing a personalized RoundIt.com savings account;
- establishes RoundIt.com account on-line;
- allows consumers to ease into saving;
- invites via e-mail to RoundIt.com's web site;
- checks out the customer's saving projection;
- shows customer's current saving rate and compares it with the potential of long-term savings product;
- builds on the business relationship between the customers and the vendors.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A patronage incentive system, comprising:
   a computer system for interactive communication between a plurality of enrolled customers having access to the Internet and at least one participating retailer having at least one point-of-sale terminal, said enrolled customers purchasing a product offered by said at least one participating retailer at said at least one point-of-sale terminal thereof at a retail price,
   a saving software program integrated into said computer system at said at least one point-of-sale terminal of said at least one participating retailer;
   a predetermined single mutual fund;
   each of said customers initiating the enrollment thereof in said patronage incentive system by interacting with said saving software program through the Internet to establish a personal account associated with said each customer and to receive a predetermined identifier of said each customer;
   said saving software program for:
   (a) rounding up said retail price of the purchased product to a rounded price amount,
   (b) crediting the difference between said rounded price amount and said retail price to said personal account associated with said each enrolled customer making purchase, and
   (c) transferring the amounts credited to said personal accounts for said plurality of enrolled customers into a merging account for investment into said predetermined single mutual fund, said merging account containing combined differences between said rounded price amounts and said retail prices for said plurality of enrolled customers, whereby said merging account and said single mutual fund are shared by said plurality of enrolled customers.

2. The patronage incentive system of claim 1, further including a plurality of said participating retailers.

3. The patronage incentive system of claim 1, further including a bank, said personal account associated with said each enrolled customer being an account established by said saving software program in said bank.

4. The patronage incentive system of claim 3, wherein said bank transfers for investment the difference between said rounded price amount and said retail price of the purchased product by establishing said merging account for said plurality of the enrolled customers with said predetermined mutual fund.

5. The patronage incentive system of claim 1, wherein said saving software program further includes customer relationship means interactively communicating with each said customer through the Internet and transmitting information regarding said personal account associated with said each enrolled customer to each said customer.

6. The patronage incentive system of claim 4, wherein said saving software program calculates a share of said each customer in said merging account and transmits the information regarding said share to said each customer.

7. The patronage incentive system of claim 1, wherein, upon a liquidation request of said each customer, said saving software program liquidates said personal account and issues a refund for said each customer.

8. The patronage incentive system of claim 1, wherein said saving software program credits said difference to said personal account through electronic transfer.

9. The patronage incentive system of claim 1, wherein said saving software program transfers said difference credited to said personal account of said each enrolled customer to said single mutual fund periodically.

10. The patronage incentive system of claim 1, wherein said saving software program calculates and records the amounts credited into said personal account.

11. The patronage incentive system of claim 1, wherein said at least one point-of-sale terminal of said at least one retailer includes a cash register screen, said saving software programs further displaying said amount credited to said personal account on said cash register screen.

12. The patronage incentive system of claim 1, wherein said saving software program further identifies said enrolled customer, the amount of the deposit credited to said personal account, and the date/time of the transaction.

13. The patronage incentive system of claim 1, wherein said saving software program provides information on said personal account to said enrolled customer associated therewith through the Internet.

14. A method of operating a patronage incentive system, comprising the steps of:
    providing a computer system for interactive communication between a plurality of customers and at least one retailer having at least one point-of-sale terminal,
    integrating a saving software program having a customer interactive indicia into said computer system at said at least one point-of-sale terminal of said at least one retailer,
    initiating enrollment of each of said plurality of customers with said patronage incentive system by interaction of each said customer with said saving software program through the Internet to establish a personal account associated with said customer and to provide each said enrolled customer with an identification means, making a purchase by said enrolled customer of a product offered by said at least one retailer at said at least one point-of-sale terminal thereof in exchange for a retail price;

actuating said saving software program by said at least one point-of-sale terminal of said at least one retailer by identifying said enrolled customer by said identification means, thereby authorizing said saving software program to initiate the saving process, including the steps of:

(a) rounding up said retail price to a rounded price amount,
(b) crediting the difference between said rounded price amount and said retail price to said personal account of said each enrolled customer, and
(c) transferring the amounts credited in each step (b) to personal accounts of said plurality of the enrolled customers to a single merging account containing combined differences between said rounded price amounts and said retail prices for said plurality of enrolled customers and depositing the single merging account into a single mutual fund for investment, whereby said merging account and said single mutual fund are shared by said plurality of enrolled customers.

15. The method of claim 14, further including the steps of creating a network of a plurality of said retailers participating in said patronage incentive system.

16. The method of claim 14, further including the steps of:
establishing a personal account database by said saving software program and recording therein data corresponding to each transaction with said personal accounts, and a share of each said enrolled customer in said predetermined single mutual fund.

17. The method of claim 16, further including the steps of:
providing information to each said enrolled customer regarding said personal accounts over the Internet.

18. The method of claim 14, further including the step of registration of each said customer by said saving software program to participate in said patronage incentive system.

19. The method of claim 14, further including the steps of:
liquidating said personal account upon said enrolled customer request, and,
issuing a withdrawal to said enrolled customer.

20. The method of claim 14, wherein said difference is credited to said personal account instantly.

21. The method of claim 14, wherein said difference is transferred to said single merging account periodically.

22. A method of doing business in a retail environment, comprising the steps of:
providing a computer system for interactive communication between a plurality of customers and at least one retailer having at least one point-of-sale terminal,
integrating a saving software program having customer interactive indicia into said computer system at said at least one point-of-sale terminal of said at least one retailer,
initiating enrollment of each of said plurality of customers by said patronage incentive system by interacting each said customer with said saving software program through the Internet to establish a personal account associated with said customer and to provide each said enrolled customer with an identification means,
making a purchase by said enrolled customer of a product offered by said at least one retailer at said at least one point-of-sale terminal thereof in exchange for a retail price;
actuating said saving software program at said at least one point-of-sale terminal of said at least one retailer by identifying said enrolled customer by said identification means, thereby authorizing said saving software program. to initiate the saving process, including the steps of:

(a) rounding up said retail price to a rounded price amount,
(b) crediting the difference between said rounded price amount and said retail price to said personal account of said each enrolled customer, and
(c) transferring the amounts credited in each step (b) to said personal accounts of said plurality of the enrolled customers to a single merging account established with a bank, said merging account containing combined differences between said rounded price amounts and said retail prices for said plurality of enrolled customers, and
(d) investing the collective amounts transferred into said merging account in said step (c) in a predetermined single mutual fund whereby said merging account and said single mutual fund are shared b said plurality of enrolled customers.

23. The method of doing business of claim 22, further including the steps of creating a network of a plurality of said retailers participating in said patronage incentive system.

24. The method of doing business of claim 22, further including the steps of:
establishing a personal account database by said saving software program, and recording therein data corresponding to each transaction with said personal accounts, and a share of each said enrolled customer in said predetermined single mutual fund.

25. The method of doing business of claim 24, further including the steps of:
providing information to each said enrolled customer regarding said personal accounts over the Internet.

26. The method of doing business of claim 22, further including the step of registration of each said customer by said saving software program to participate in said patronage incentive system.

27. The method of doing business of claim 22, further including the steps of:
liquidating said personal account upon said enrolled customer request, and,
issuing a withdrawal to said enrolled customer.

28. The method of doing business of claim 22, wherein said difference is credited to said personal account instantly.

29. The method of doing business of claim 22, wherein said difference is transferred to said single merging account periodically.

30. A patronage incentive system, comprising:
a computer system for interactive communication between a plurality of customers enrolled in said patronage incentive system and having access to the Internet, and at least one retailer participating in said patronage incentive system, said customers purchasing a respective product offered by said at least one retailer at least one point-of-sale terminal thereof at a retail price;
a saving software program integrated into said computer system at said at least one point-of-sale terminal of said at least one participating retailer, said saving software program being interactive with each said enrolled customer through the Internet; and,
a data transmission signal generated by said computer system to be sent to a central data base indicating a rounded price amount for each customer transaction, said saving software program establishing a single merging account associated with a bank and transferring the difference between said rounded price amount and said retail price for each customer transaction to said single merging account for periodic investment in a predetermined single mutual fund, said single merging account containing combined differences between said rounded price amounts and said retail prices for said plurality of enrolled customers, whereby said single merging account and said single mutual fund are shared by said plurality of enrolled customers.

31. The patronage incentive system of claim 30, wherein said saving software program calculates a share of each of said plurality of said enrolled customers in said predetermined single mutual fund.

32. The patronage incentive system of claim 30, wherein said saving software program credits said difference between said rounded price amount and said retail price to said personal accounts instantly for each said enrolled customer.

33. The patronage incentive system of claim 30, wherein said saving software program transfers said difference between said rounded price amount and said retail price to said single merging account periodically.

* * * * *